Dec. 24, 1935.     J. C. FORD     2,025,030
STRIPPER
Filed Aug. 17, 1933     3 Sheets-Sheet 1

Inventor:
Joseph C. Ford
By Cox & Moore
attys.

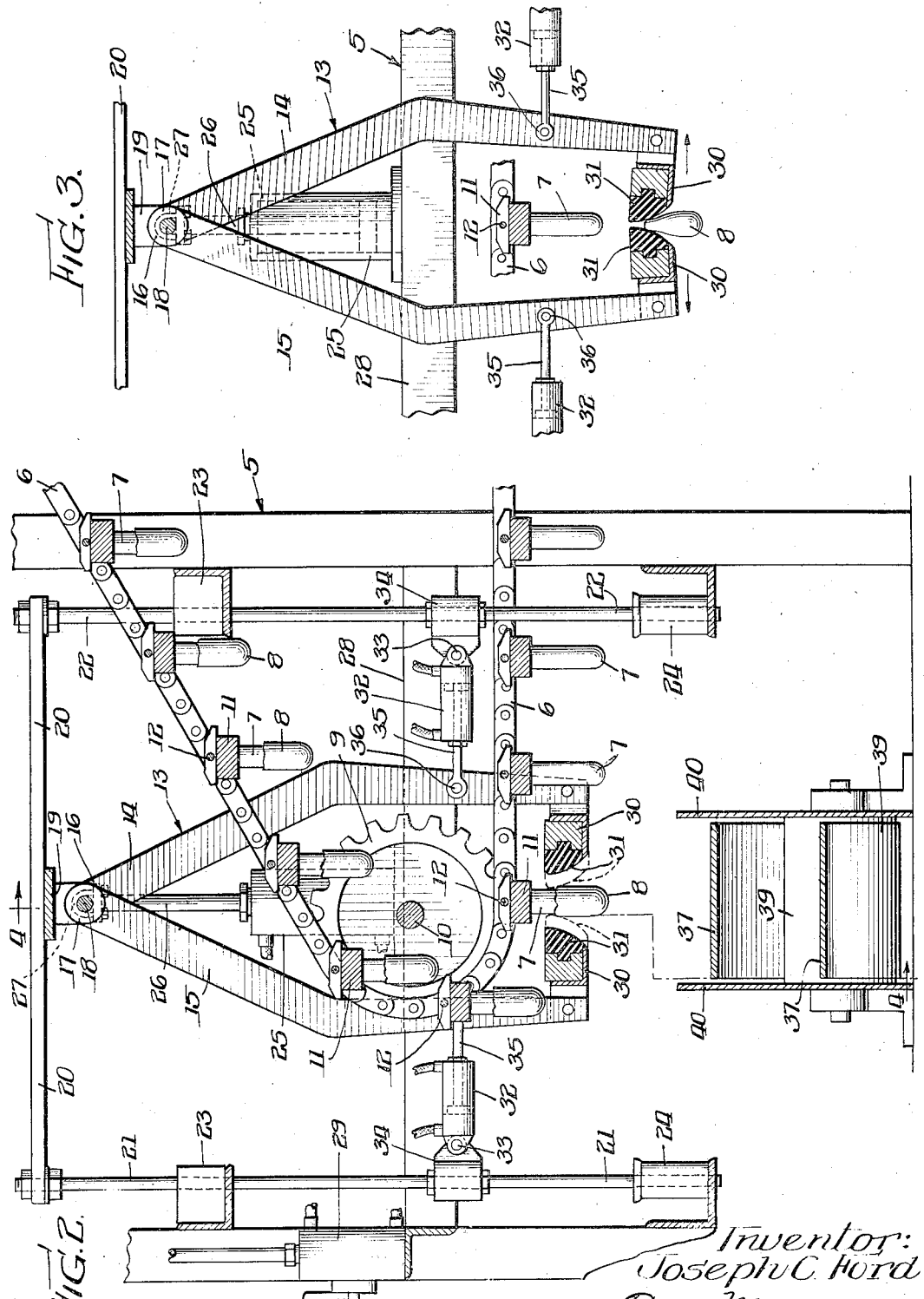

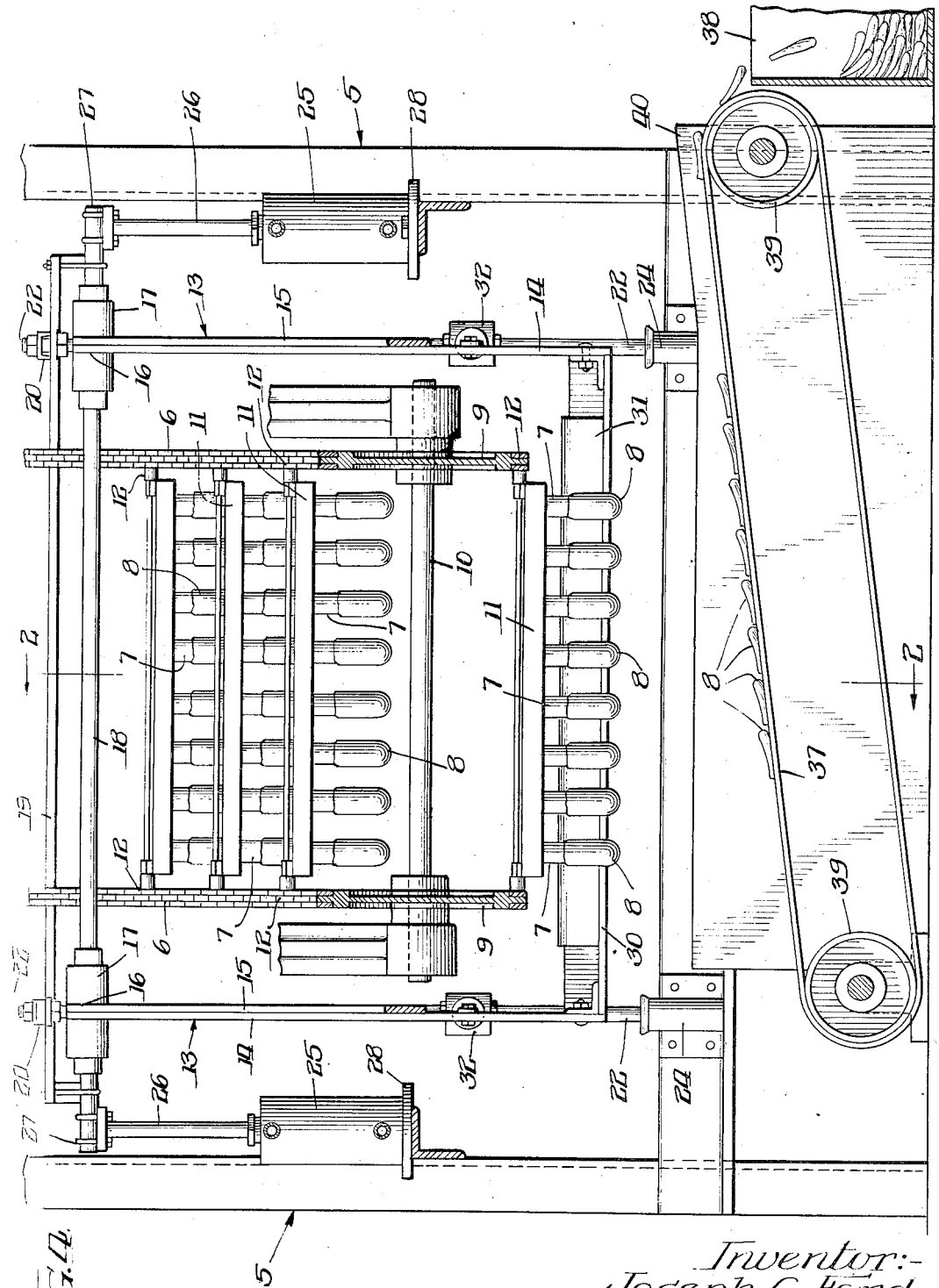

Patented Dec. 24, 1935

2,025,030

UNITED STATES PATENT OFFICE 2,025,030

STRIPPER

Joseph C. Ford, Madison, Wis., assignor to The Celon Company, Madison, Wis., a corporation of Wisconsin Application August 17, 1933, Serial No. 685,580

8 Claims. (Cl. 18—2)

This invention relates to stripper mechanism, and particularly to an apparatus for stripping regenerated tubes from the molds upon which they are formed.

The primary object of the invention is to provide new and novel apparatus and mechanism for stripping a hydrated regenerated tube from the exterior surface of a mold upon which the tubes are made immediately after the tubes are regenerated.

Another object is to provide new and simple stripping mechanism for stripping regenerated cellulose tubes from the molds immediately after the molds leave the regeneration bath and prior to the time the gases, formed during the manufacture of the tubes, are dissipated from the tubes.

A still further object is to provide automatically operated positively controlled strippers for clampingly engaging opposite surfaces of a plurality of alined molds and stripping the hydrated tubes from the molds successively and constantly as the tubes are fed to stripping position.

Numerous other objects and advantages will be apparent throughout the progress of the following specification.

The accompanying drawings illustrate a selected embodiment of the invention and the views therein are as follows:

Fig. 2 is a similar view showing the stripper mechanism moved to a position just prior to stripping position on the line 2—2 of Fig. 4.

Fig. 3 is a view similar to Figs. 1 and 2 but showing the position of the parts immediately after the stripping operation.

Fig. 4 is a detail sectional view on the line 4—4 of Fig. 2.

Figure 1:
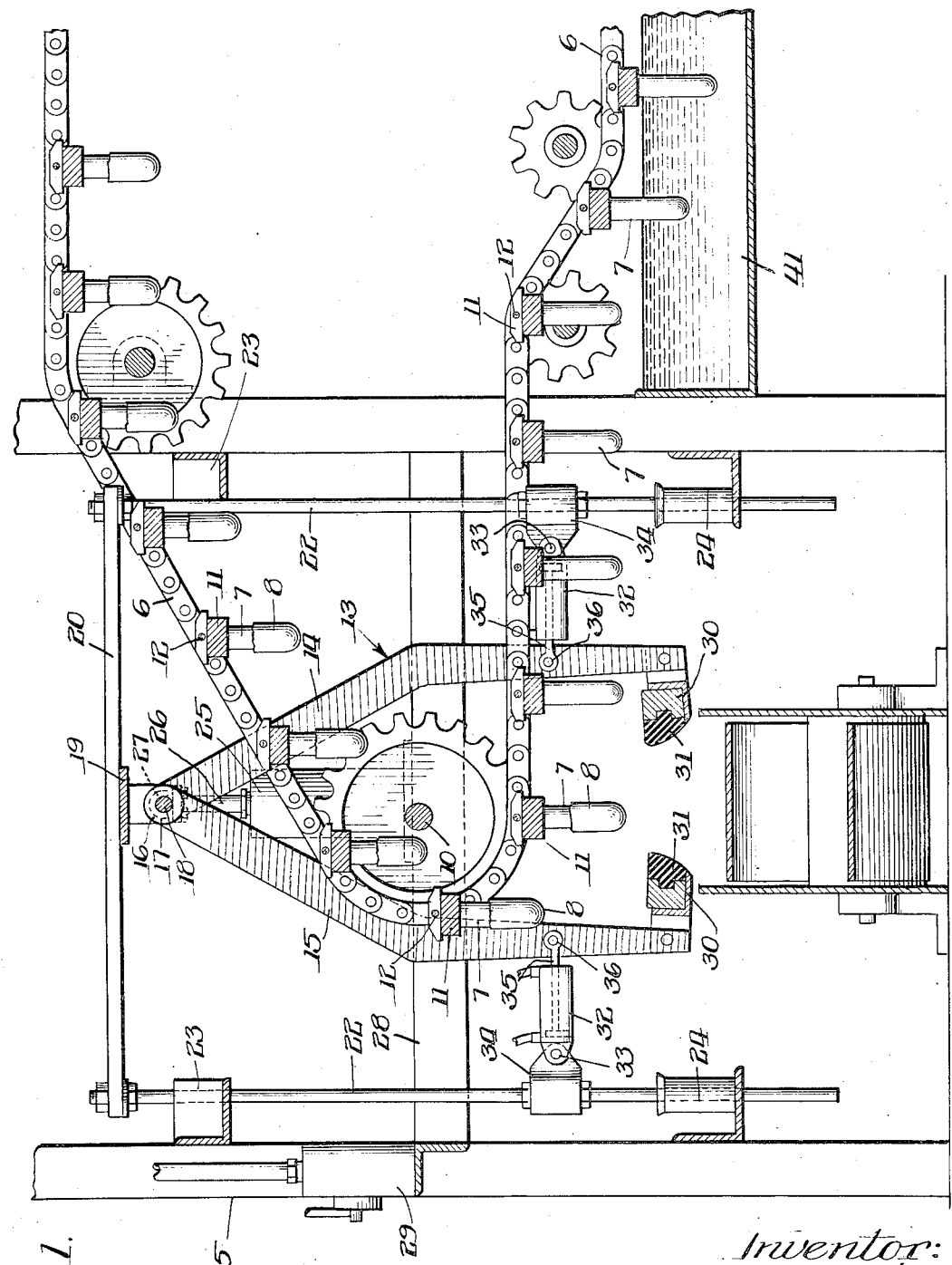
Fig. 1 is a detail end elevation partly in section showing the stripper mechanism in normal or rest position.

Referring to the drawings, 5 designates a suitable framework which supports constantly moving endless chains 6 for moving a plurality of molds 7 along a predetermined path for dipping the molds in a substance and then regenerating the substance. The manner of operating the molds, coating the molds with a film of substance, and regenerating the substance may be done in any conventional manner well known in the art. An apparatus upon which the tubes of regenerated cellulose may be made is shown and described in applicant's copending application, Serial No. 685,579, filed August 17, 1933.

After the molds have been treated with the substance to provide films over the molds, and the substance is regenerated to provide hydrated regenerated tubes 8, the molds are passed to stripping position to have the tubes 8 removed from the molds. At the discharging end of the apparatus the molds continue their circuitous path, being carried by the chains 6 over sprockets 9 which are supported by a shaft 10. The supports 11 carrying the molds 7 extend longitudinally from one side of the machine to the other as shown in Fig. 4. The supports 11 are pivotally connected to the chains 6 as indicated at 12, and due to the weight of the molds they normally hang downward as shown in the various figures. After the molds encircle the sprockets and extend in down position, a stripper mechanism 13 is provided for stripping the tubes 8 from all the molds 7 carried by each support 11 as each support 11 moves successively to stripping position. This stripper mechanism comprises oppositely disposed pivoted members each having oppositely disposed arms 14 and 15 arranged near each side of the frame. The arms 14 and 15 are pivotally supported at 16 to bearings 17 fastened to a transverse shaft 18 which is carried by a transverse member 19 connecting the cross members 20. The cross members 20 are connected to vertical rods 21 and 22 which are slidingly supported in the members 23 and 24. These members prevent horizontal or lateral movement of the rods 21 and 22 but permit free slidable movement of the rods therethrough. Cylinders 25 are provided with pistons 26 which are connected to the shaft 18 as indicated at 27. These pistons are supported by members 28 fastened to the frame 5. The cylinders are operatively connected to a control valve 29 and upon operation raise and lower the pistons 26 which consequently raise and lower the arms 14 and 15.

The arms 14 and the arms 15 are connected by stripper bars 30 having flexible gripping surfaces 31.

Cylinders 32 are operatively fastened at 33 to members 34 which are carried by the vertical rods 21 and 22. Pistons 35 on the cylinders 32 are operatively connected to the arms 14 and 15 as indicated at 36. The cylinders 32 are also operatively connected to the main control valve 29. Upon operation of the control valve 29, air is supplied to the cylinders 25 and 32. The pistons 26 raise upwardly and move the arms 14 and 15 upwardly from the position shown in Fig. 1 to the position shown in Fig. 2. The plungers or pistons of the cylinders 32 also extend outwardly, and move the arms 14 and 15 inwardly to bring the gripping surfaces 31 into gripping relationship relative to tubes 8 on the molds 7. The normal position of the parts is as shown in Fig. 1. During operation of the chains, a support 11 carrying the molds 7 is moved to position between the arms 14 and 15 and the stripper bars 30. The valve 29 is then operated, causing the arms 14 and 15 to move upwardly as shown in Fig. 2, whereby the molds 7 will be spaced between the stripper bars 30. The plungers 35 move outwardly from the pistons and cause the arms 14 and 15 to swing inwardly bringing the gripping surfaces 31 into contacting relationship with the tubes 8 on the molds 7. After the flexible surfaces 31 are in gripping relationship with the tubes 8, as indicated by the dotted lines in Fig. 2, the pistons 26 will return to lowered position causing the tubes 8 to be stripped from all the molds 7 carried by a support 11 as shown in Fig. 3. The pistons 35 will then return into the cylinders and spread the arms 14 and 15 apart to the normal position shown in Fig. 1. The tubes 8, after the spreading apart of the arms, will drop on a conveyor belt 37 and be deposited into a tank 38. The belt 37 is of the endless type passing around rollers 39, one of which may be driven. Side members 40 are arranged on either side of the belt to prevent the tubes 8 thereon from becoming displaced, Figs. 2 and 4.

After the stripping operation, the molds 7 will continue to feeding position to be again dipped into the substance, when the cycle of operation is again repeated. However, prior to returning to feeding position, the molds pass through a liquid tank 41 and are washed, Fig. 1.

The stripping mechanism 13 is arranged near the end of the apparatus immediately beyond the place where the film on the molds becomes regenerated. During the manufacture of the tubes 8, a gas is generated due to the chemical action during the process of manufacture and due to the chemical action of the baths through which the substance passes. Some of the gas is formed exteriorly of the molds and inwardly of the tubes and tends to form a space between each tube and the exterior surface of its mold. It is, therefore, desirable to strip the tubes from the molds within one minute after the tubes pass through the regeneration bath. By so doing, the gases generated assist in loosening the tubes from the molds, therefore making it relatively easy for the stripper to remove the tubes. If, however, the tubes are not removed within one minute after they pass through the regenerating bath, the gases will become dissipated and the tubes will tend to bind on the molds. If such a condition occurs, it is relatively hard to remove the tubes from the molds, and the tubes may become damaged. It is, therefore, one of the objects of this invention to strip the tubes from the molds at a time immediately subsequent to the time when the tubes are regenerated into hydrated cellulose.

After the tubes are deposited into the tank 38, they are cut, trimmed, dyed any color desired and packed wet for shipment in their hydrated state to provide sealing elements, such as caps or bands, for bottles and other containers. The hydrated article, when placed upon a container and permitted to become dehydrated, shrinks tightly about the container providing a protecting seal.

The invention provides automatic means for simultaneously stripping a plurality of hydrated regenerated cellulose tubes from a plurality of molds which are mounted on a continuously moving support. The operation of the stripper is efficient and the parts are so timed that the stripping operation occurs when a support carrying the molds reaches a predetermined position. The stripper is flexible to a certain degree to permit the parts to operate and strip the tubes during continuous movement of the molds. The pivotal connection of the mold supports on the chains permits the stripper to strip the tubes from the molds while the molds are moving. The stripper is relatively simple in construction, composes few and relatively simple parts, is efficient in operation, and causes stripping of the tubes from the molds without in any way damaging the tubes. The stripper element is self-contained and is capable of being applied to tube making machines now in use.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In stripper mechanism for stripping a plurality of regenerated cellulose films from a plurality of spaced molds, comprising means for moving a plurality of filmed molds to stripping position, spaced jaws for coacting with the molds, means for moving the jaws to a position where the molds will be between the jaws, fluid pressure operated piston means for closing the jaws against the molds, and means for moving the jaws away from the molds while in closed position whereby the jaws will clamp and strip the films from the molds.

2. In stripper mechanism for stripping a plurality of regenerated cellulose films from a plurality of spaced molds, comprising means for moving a plurality of filmed molds to stripping position, spaced jaws for coacting with the molds, fluid pressure operated piston means for moving the jaws to a position where the molds will be between the jaws, fluid pressure operated piston means for closing the jaws against the molds, fluid pressure operated piston means for moving the jaws away from the molds while in closed position whereby the jaws will clamp and strip the films from the molds.

3. In stripper mechanism for stripping a plurality of regenerated cellulose films from a plurality of spaced molds, comprising means for moving a plurality of filmed molds to stripping position, a pair of spaced jaws for coacting with the molds, means for moving the jaws to a position where the molds will be between the jaws, a fluid pressure operated piston connected to each jaw for moving it against the molds, and means for moving the jaws away from the molds while in closed position whereby the jaws will clamp and strip the films from the molds.

4. The combination with a plurality of constantly moving spaced bars, and a plurality of spaced filmed molds connected to said bars for limited movement relative thereto, of stripper mechanism for removing the films from the molds in successive steps comprising spaced jaws, means for moving the spaced jaws in respect to a bar carrying the spaced filmed molds so that the jaws will be on opposite sides of the molds on a bar as the bars move successively into stripping position, means for closing the jaws when so positioned to clamp the filmed molds therebetween, means for moving the jaws away from the molds when in such clamped position to strip the films from the molds on a said bar, whereby the films will be clamped by the jaws, and means for again opening the jaws to release the films.

5. The combination with a plurality of constantly moving spaced bars, and a plurality of spaced filmed molds loosely pivotally suspended from said bars, of stripper mechanism for removing the films from the molds in successive steps comprising spaced jaws, means for moving the spaced jaws in respect to a bar carrying the spaced filmed molds so that the jaws will be on opposite sides of the molds on a bar as the bars move successively into stripping position, means for closing the jaws when so positioned to clamp the filmed molds therebetween, means for moving the jaws away from the molds when in such clamped position to strip the films from the molds on a said bar, whereby the films will be clamped by the jaws, means for again opening the jaws to release the films, means for receiving the films when released from the jaws, and means for repeating the cycle of operation of said jaws as the mold carrying bars move successively to stripping position, said pivotal suspension of the molds serving to permit continuous bar movement during the stripping operation.

6. Stripper mechanism for stripping regenerated cellulose films from molds comprising means for moving a mold to stripping position, a support, a pair of spaced jaws carried by said support, means for moving the jaws to a position wherein the mold in stripping position lies between the jaws, fluid pressure operated piston means carried by the support for closing the jaws against the mold, and means for moving the jaws away from the mold while in closed position whereby the jaws will clamp and strip the film from the mold.

7. Stripper mechanism for stripping regenerated cellulose films from molds comprising means for moving a mold to stripping position, a support, a pair of spaced jaws carried by said support, means for moving the jaws to a position wherein the mold in stripping position lies between the jaws, fluid pressure operated piston means pivotally carried by the support and pivotally connected to the jaws for closing the jaws against the mold, and means for moving the jaws away from the mold while in closed position whereby the jaws will clamp and strip the film from the mold.

8. Stripper mechanism for stripping regenerated cellulose films from molds comprising a continuously laterally movable conveyor, a filmed mold loosely connected to said conveyor for limited movement relative thereto, a laterally immovable support, a pair of spaced stripping jaws carried by said support, means for moving the jaws toward the conveyor to a position wherein the mold will be between the jaws, means for closing the jaws against the mold, and means for withdrawing the jaws from the mold while in closed position whereby to strip the film from the mold, said loose connection between the mold and the conveyor serving to permit continuous conveyor movement during the stripper operation.

JOSEPH C. FORD.